US010459115B2

(12) United States Patent
Krugel

(10) Patent No.: US 10,459,115 B2
(45) Date of Patent: Oct. 29, 2019

(54) METHOD AND DEVICE FOR DETECTING A MATERIAL

(71) Applicant: Daniel Rudolph Krugel, Bloemfontein (ZA)

(72) Inventor: Daniel Rudolph Krugel, Bloemfontein (ZA)

(*) Notice: Subject to any disclaimer, the term of this patent is extended or adjusted under 35 U.S.C. 154(b) by 223 days.

(21) Appl. No.: 15/557,850

(22) PCT Filed: Mar. 25, 2016

(86) PCT No.: PCT/IB2016/051704
§ 371 (c)(1),
(2) Date: Sep. 13, 2017

(87) PCT Pub. No.: WO2016/151538
PCT Pub. Date: Sep. 29, 2016

(65) Prior Publication Data
US 2018/0292571 A1  Oct. 11, 2018

(30) Foreign Application Priority Data

Mar. 25, 2015 (ZA) .................. 2015/02058

(51) Int. Cl.
*G01V 9/00* (2006.01)
*G01V 3/08* (2006.01)

(52) U.S. Cl.
CPC ............. *G01V 9/00* (2013.01); *G01V 3/081* (2013.01)

(58) Field of Classification Search
CPC ................. G01V 9/00; G01V 3/081
USPC .............................. 324/207.25, 300
See application file for complete search history.

(56) References Cited

U.S. PATENT DOCUMENTS 7,276,902 B1 * 10/2007 Xiang .................... G01N 24/00
324/300
2002/0086417 A1 * 7/2002 Chen ..................... B01L 3/5027
435/287.3

* cited by examiner

*Primary Examiner* — Farhana A Hoque
(74) *Attorney, Agent, or Firm* — Haugen Law Firm PLLP

(57) ABSTRACT

THIS INVENTION relates to a method and a device for detecting a target material at a distance. The device includes a means for indicating the direction to the target material, a primary energy source for subjecting a sample material to energy and a means for sensitizing the device, and specifically an indicating means thereof, such that the indicating means detects target material similar to the sample material.

20 Claims, 6 Drawing Sheets

METHOD AND DEVICE FOR DETECTING A MATERIAL

BACKGROUND OF THE INVENTION

THIS INVENTION relates to a method and a device for detecting a target material at a distance.

The field of matter detection consists of a variety of technologies to detect and locate matter. For example inductive coils and magnetometers are used in metal detectors to locate metal objects of varying size. In geophysical surveys ultrasound is used to determine the density of ground and hence infer what constitutes it. In medical applications, high magnetic fields, radio waves and field gradients are used to map the spatial distribution of water in tissue and hence map the body's structure.

At present there exists no technology to simply detect and identify specific types of matter (e.g. precious materials, dangerous weaponry, disease) while some detection methods do not work well at a distance (e.g. metal detectors).

This patent seeks to exploit the underlying forces and/or energies between similar matter using relationships between matter's own in-built energy (e.g. chemical, thermal, kinetic, potential, quantum mechanical) and fields (e.g. light, electric, electromagnetic, magnetic) over a variety of distances.

The inventor through a number of experiments, which will be elaborated herein in detail, claims to be capable of showing that like matter communicates and/or attracts other like matter.

SUMMARY OF THE INVENTION

According to the invention, there is provided a device for detecting a target material including:
a means for indicating the direction to the target material;
a primary energy source for subjecting a primary sample material to energy for exciting the primary sample material, thereby identifying the target material to be detected, wherein the primary sample material:
(i) is similar to the target material;
(ii) is related with the target material; and/or
(iii) at least temporarily retains within it, or an electromagnetic or magnetic field thereof, some of the properties of the target material; and
a means for sensitising the device and/or the indicating means thereof thereby to detect a force or energy acting between the operatively sensitised device and/or the indicating means thereof and the target material;
such that in use, and under the influence of such force or energy of the target material acting on the sensitised device and/or the indicating means thereof, the indicating means points in the direction of such detected target material.

The indicating means may incorporate at least an information output component, for outputting information relating to the target material, and at least one moving component on which the force or energy of the target material operatively acts.

Generally, the moving component of the indicating means is a free moving needle, a mass weighing apparatus, a gyroscope or any combination thereof.

Typically, the information output component of the indicating means is:
the moving component of the indicating means, the operative movement or direction in which the moving component respectively moves or points communicates at least the direction of the target material; or
a visual and/or audible readout of at least the direction of the target material correlated to the movement of the moving component of the indicating means.

It will be appreciated that with a device capable of outputting direction only, triangulation methodology will be necessary to identify the location of the target material.

Preferably, the information output component will ultimately be capable of communicating not only direction, but also other information such as distance to, elevation of, density of, specific mass of and size of the target material.

The free moving needle may be pivotally displaceable about one or more pivot axes. Typically, the needle is pivotally supported near one of its ends.

Generally, the primary energy source is one or more energy emitters from a group of emitters including: electromagnetic energy emitters, magnetic energy emitters, sound energy emitters, thermal energy emitters, chemical energy emitters and electrical current emitters.

Furthermore, the primary sample material may subjected to the energy from the primary energy source within an excitation zone, which excitation zone extends from such primary energy source outwardly, wherein the excitation zone may be an area of many thousands of kilometers around the primary energy source.

In one embodiment, the primary sample material and the primary energy source may be one and the same object, i.e. an electromagnet, a permanent magnet, heater water.

It will be appreciated that the sensitising means includes direct and/or indirect sensitising means, and further wherein:
(i) direct sensitising means is the physical mounting of a secondary sample material on the moving component of the indicating means; and
(ii) indirect sensitising means is a secondary energy source for subjecting a secondary sample material to energy within a detection zone which:
a. extends from the moving component of the indicating means outwardly; or
b. is spaced from the indicating means and lies between the secondary energy source and a collector member, the collector member being connected by a connector member to the device or the moving component of the indicating means thereof.
wherein the secondary sample material:
(i) is the primary sample;
(ii) is similar to the target material;
(iii) is related with the target material; and/or
(iv) at least temporarily retains within it, or an electromagnetic or magnetic field thereof, some of the properties of the target material.

Typically, the device comprises both the primary and secondary energy sources. Alternatively, a single energy source acts as the primary and/or the secondary energy sources.

Generally, the energy sources are positioned near and/or beneath the moving component of the indicating means.

Furthermore, the device may further include a means for locating the primary and/or secondary sample material in the detection zone, wherein the detection zone is a volume about the moving component of the indicating means, which volume may span a distance dependent on the power of the energy sources, but practically a distance of up to 25 meters from the moving component of the indicating means.

The free moving needle of the indicating means may be pivotally displaceable about or on an axle relative to a U-shaped support body, the axle extending across the U-shaped support body at a location near first and second free ends thereof.

Preferably, the device is portable and comprises a means for levelling the device.

The secondary sample of the material may be: mounted directly on the moving component of the indicating means, supported in a purpose-built formation (i.e. a spoon-like formation) on the moving component of the indicating means and/or mounted on, in contact with or near a conductor, such as a metallic plate, made from copper or aluminium, and through which an energy from an energy source may be directed, i.e. electric current or radio waves.

The moving component of the indicating means may be made from any material, but preferably from a non-magnetic and/or electrically non-conductive material.

Although it is possible for the primary and/or secondary energy sources to be independent devices locatable remotely from the device, it is preferably that one or both are incorporated into one and the same device.

Generally, the collector member is a metal cone, a metal plate or some or other conductor that the sample, primary and/or secondary, may be placed near to or in contact with. The connector member may be made of a conductive material. The conductive material may be electrically conductive.

According to a second aspect of the invention, there is provided a method for detecting a target material including the steps of:

(A) subjecting a primary sample material to energy from a primary energy source so as to excite the primary sample material, thereby identifying the target material to be detected, wherein the primary sample material:
  (i) is similar to the target material;
  (ii) is related with the target material; and/or
  (iii) at least temporarily retains within it, or an electromagnetic or magnetic field thereof, some of the properties of the target material;

(B) sensitising a device and/or an indicating means thereof thereby to detect a force or energy acting between the operatively sensitised device and/or the indicating means thereof and the target material; and (C) allowing the indicating means, under the influence of such force or energy, to point in the direction of such detected target material.

The primary energy source may be one or more energy emitters from a group of emitters including: electromagnetic energy emitters, magnetic energy emitters, sound energy emitters, thermal energy emitters, chemical energy emitters and electrical current emitters.

Generally, the excitation of the primary sample material occurs within an excitation zone, which excitation zone extends from such primary energy source outwardly, wherein the excitation zone may be a volume of many thousands of kilometers around the primary energy source.

Typically, the primary sample material and the primary energy source is object, i.e. an electromagnet, a permanent magnet, heated water.

Preferably, the sensitisation of the device or the indicating means is attained directly and/or indirectly, and further wherein:

(i) direct sensitisation is attained by physical mounting a secondary sample material on a moving component of the indicating means; and (ii) indirect sensitisation is attained by subjecting a secondary sample material to the energy of a secondary energy source within a detection zone which:
  c. extends from the moving component of the indicating means outwardly; or
  d. is spaced from the moving component of the indicating means and lies between the secondary energy source and a collector member, the collector member being connected by a connector member to the device or the moving component of the indicating means thereof.

wherein the secondary sample material:
  (i) is the primary sample;
  (ii) is similar to the target material;
  (iii) is related with the target material; and/or
  (iv) at least temporarily retains within it, or an electromagnetic or magnetic field thereof, some of the properties of the target material.

The primary and the secondary energy sources may be independent energy sources. Alternatively, a single energy source acts as the primary and/or the secondary energy sources.

Preferably, at least one of the energy sources is positioned near and/or beneath the moving component of the indicating means.

Furthermore, the moving component of the indicating means may be a free moving needle, a mass weighing apparatus, a gyroscope or any combination thereof, and further wherein the indicating means includes at least an information output component being:

the moving component of the indicating means, the operative movement or direction in which the moving component respectively moves or points communicates at least the direction of the target material; or a visual and/or audible readout of at least the direction of the target material correlated to the movement of the moving component of the indicating means.

It will be appreciated that the method may further include the step of mounting the free moving needle such that it is pivotally displaceable about one or more pivot axes.

Generally, the free moving needle is pivotally displaceable about or on an axle relative to a U-shaped support body, the axle extending across the U-shaped body at a location near first and second free ends thereof.

The method may further include, in a sample zone and in the presence of an electromagnet or permanent magnet, subjecting a sample of the target material to energy from the primary energy source such that the electromagnet or permanent magnet at least temporarily retains within it, or an electromagnetic or magnetic field thereof, some of the properties of the target material, such that the electromagnet or permanent magnet acts as the primary sample material.

Typically, the step of subjecting the sample of the target material to energy from the primary energy source in the presence of the electromagnet or the permanent magnet is followed by the removal of the sample of the target material and locating the electromagnet or permanent magnet in the detection zone.

A method may also extend to include, in a sample zone and in the presence of an electromagnet or permanent magnet, subjecting a sample of the target material to energy from the primary or the secondary energy source such that the electromagnet or permanent magnet at least temporarily retains within it, or an electromagnetic or magnetic field thereof, some of the properties of the target material, such that the electromagnet or permanent magnet acts as the secondary sample material.

Generally, the step of subjecting the sample of the target material to energy from the primary or the secondary energy source in the presence of the electromagnet or the permanent magnet is followed by removal of the sample of the target material and mounting the electromagnet or permanent magnet on the moving component of the indicating means before or after subjecting the sample of the target material to energy from the primary or the secondary energy source.

The sample zone may be within or spaced from the detection zone. The sample zone is a volume about the electromagnet or the permanent magnet, which volume may span a distance dependent on the power of the energy sources, but practically a distance of between 1 centimeter to 10 meters from the electromagnet or the permanent magnet.

It will be appreciated that the step of subjecting the sample of the target material to energy from the energy sources in the presence of the electromagnet or the permanent magnet acts such that the electromagnet or the permanent magnet becomes a "clone" of the target material, where reference to the term "clone" does not mean to visually resemble the target material, but rather to incorporate in it or within a field about it, one or more properties or signatures or quantum characteristic of the target material.

The target material and/or samples thereof may be selected from inorganic materials, organic materials and composite materials. For example, the method and device of the invention has been found to be able to detect inorganic carbon such as oil, diamonds or the like, organic materials such as a single cell eukaryotic organism (for example the yeast Saccharomics crevisiae in 20 powder form), multi-cellular eukaryotic animal cells or organs such as human hair, organic multi-cellular material such as blood and organic multi-cellular material such as a biopsy sample of cancerous animal tissue.

Preferably, and using the device and/or the method, the sample of the target material may be a sample of a degenerating disease, and further wherein the method includes the step of using the electromagnet or permanent magnet exposed to such sample to locate and/or treat an organ in a patient suffering from the degenerating disease, which may be cancer.

According to another aspect of the invention, there is provided a method of detecting a target material at a distance including the steps of:
mounting a pointing needle by a pivotal connection for pivotal displacement about an operatively vertical axis, the pivotal connection defining a pivotal connection zone extending around the pivotal connection and the needle defining a detection zone;
in the detection zone, subjecting a sample of the material to be detected to energy, and
allowing the pointer or needle to pivot freely, so that it points in the direction of the target material, thereby detecting the target material.

According to yet another aspect of the invention, there is provided a method of detecting a target material at a distance including the steps of:
mounting a pointing needle by a pivotal connection for pivotal displacement in a horizontal plane, the pivotal connection defining a pivotal connection zone extending around the pivotal connection and the needle defining a detection zone;
in a sample zone and in the presence of an electromagnet or permanent magnet, subjecting a sample of the material to be detected to energy for a predetermined period;
optionally subjecting the pivotal connection zone to energy such as heat, light or both;
removing the sample of material and locating the electromagnet or the permanent magnet in the detection zone, and
allowing the pointer or needle to pivot freely, so that it points in the direction of the target material to be detected.

According to a further aspect of the invention, there is provided a method of detecting a target material at a distance including the steps of:
mounting a pointing needle by a pivotal connection for pivotal displacement in a horizontal plane, the pivotal connection defining a pivotal connection zone extending around the pivotal connection and the needle defining a detection zone;
in a sample zone and in the presence of an electromagnet or permanent magnet, subjecting a sample of the material to be detected to energy for a predetermined period;
locating a sample of the material to be detected at or near the end of the needle; and
moving the sample and the electromagnet or the permanent magnet in the detection zone so that the pointer or needle points in the direction of the sample and magnet.

In a variation of this embodiment, the electromagnet or the permanent magnet can be used on its own.

According to yet a further aspect of the invention, there is provided a method of detecting a target material at a distance including the steps of:
pivotally mounting a pointing needle for pivotal displacement about an operatively vertical axis;
locating a sample of the material to be detected adjacent the needle and subjecting the sample of the material to energy; and
allowing the needle to pivot freely so that it points in the direction of the target material to be detected, thereby detecting the material.

According to an even further aspect of the invention, there is provided a method of detecting a target material at a distance including the steps of:
mounting a pointing needle by a pivotal connection for pivotal displacement about an operatively vertical axis, the pivotal connection defining a pivotal connection zone extending around the pivotal connection and the needle defining a detection zone;
locating a sample of the material to be detected in a sample zone remote from the detection zone and the connection zone and subjecting the sample of the material to be detected to energy;
locating a collector member adjacent the sample, the collector member being connected to the pivotal connection by means of a connector member; and
allowing the needle to pivot freely, so that it points in the direction of the target material to be detected, thereby detecting the material.

It will be appreciated that reference to the term needle will be understood to mean any pointer type member.

It will be appreciated further that energy refers to any form of energy inclusive of magnetic, heat, light, radio waves, sound waves, electrical, thermal, chemical, electromagnetic (where the aforementioned does not already form part thereof) or any combination thereof.

BRIEF DESCRIPTION OF THE DRAWINGS

The invention will now be described in more detail, by way of example only, with reference to the accompanying drawings in which.

DESCRIPTION OF EMBODIMENTS

Figure 1:
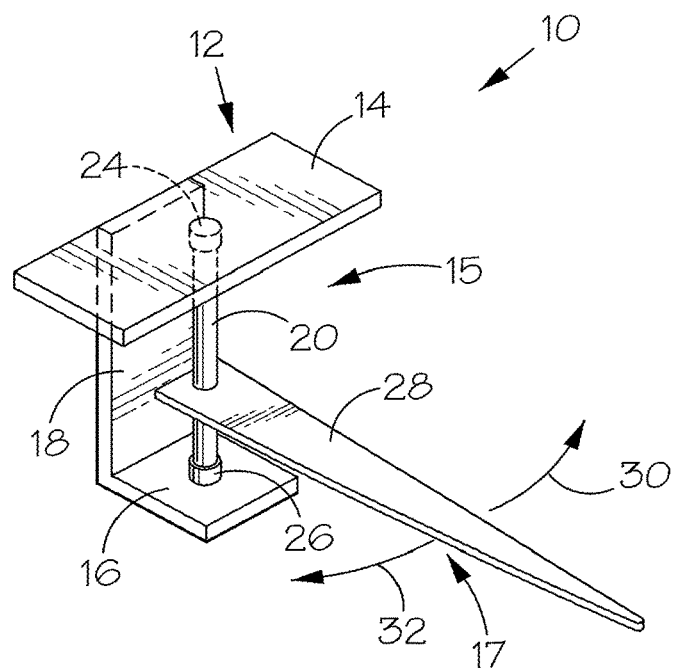
FIG. 1 shows a three dimensional view of a detection device in accordance with the present invention.

Referring to the drawings, reference numeral 10 generally designates a detection device in accordance with the present invention, which will hereinafter be referred to as the detector 10.

The detector 10 includes a substantially U-shaped support body 12, which could be a U-bolt or, and as depicted, made up of a top plate 14, a base plate 16 and a back plate 18 extending from the base plate 16 to the top plate 14 so that the top plate 14 overlaps the bottom plate 16. In a preferred embodiment of the invention, the body 12 is metallic, possibly copper.

A shaft 20, possibly make of carbon fibre material, extends between free ends of the plates 14, 16. The shaft 20 is mounted for free rotation in mounting members 24 and 26 attached to the top and bottom plates 14, 16 respectively.

The detector further includes a means 28 for indicating the direction to a target material to be detected. The indicating means 28 may incorporate at least an information output component, for outputting information relating to the target material, and at least one moving component on which a force or energy of the target material operatively acts.

In the illustrated embodiment, the information output component and the moving component of the indicating means 28 is one and the same pointing needle 28.

The needle 28 is mounted on the shaft 20 so that it can freely rotate in a substantially horizontal plane as shown by the arrows 30, 32. It will be appreciated that enhanced versions of the detector 10 may enable the needle to move about multiple axes.

It will be appreciated further that: (i) the mounting members 24 and 26 may be bores defined in the top and bottom plates 14, 16 in which the shaft 20 is rotatable; (ii) the shaft 20 is fixed to the body 12 such that the needle 28 is rotatable about the shaft; and (iii) that the shaft 20 is a thread or cord member.

The volume around the shaft 20 designated by the reference numeral 15, is referred to as the pivotal connection zone. The volume around the needle 28, designated by the reference numeral 17, is referred to as the detection zone.

The pivotal connection zone 15 extends for a distance of between about 1 to 10 centimeters around the shaft 20, while the detection zone 17 extends for a distance of about 10 centimeters and 25 meters around the needle 28. Exposure of energy (heat or light) within the pivotal connection zone 17 is believed to increase the efficiency of the detector 10, but is not absolutely necessary.

Figure 2:
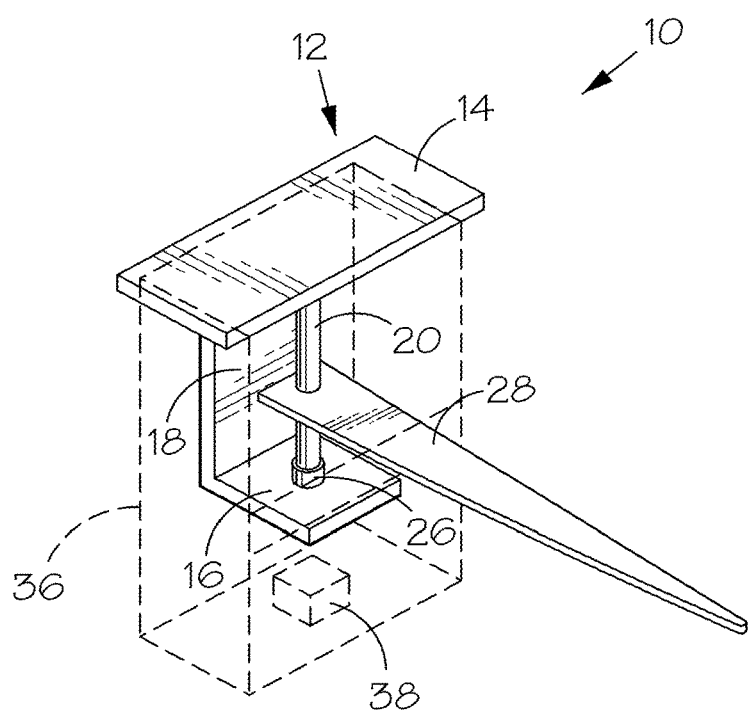
FIG. 2 shows the detection device of FIG. 1 mounted in a hand held support.

With reference now to FIG. 2, the detector 10 is mounted in a support structure, shown schematically by the dotted lined box 36 and includes a primary energy source 38, being some or other energy source emitter, for subjecting a primary sample material to energy thereby to excite the primary sample material and consequently, and to the best of the inventors knowledge and observations, excite similar target material in an excitation zone, which may span thousands of kilometers from the primary energy source 38, thereby to identify the target material to be detected.

The primary energy source 38 may be any type of energy emitter including electromagnetic energy emitters, magnetic energy emitters, sound energy emitters, thermal energy emitters, chemical energy emitters and electrical current emitters.

The primary sample material may be similar to the target material—for example a diamond where the target material to be detected is a diamond. Alternatively, the primary sample material may be related with the target material—for example a strand of hair where the target material is the human being from whom the hair originated.

The primary sample material may even be an electromagnet or permanent magnet that at least temporarily retains within it, or within its electromagnetic or magnetic field, some of the properties or a signature or quantum characteristic of the target material, through a process that will be described later in the specification. The use of electromagnet or permanent magnet to effectively "clone" the target material enables the detector 10 to operate in the field without having to carry around expensive, dangerous or contagious sample.

Accordingly, and as illustrated in FIG. 2, the primary energy source and the primary sample material is one and the same object, i.e. an electromagnet or permanent magnet retaining some of the properties or a signature or quantum characteristic of the target material.

Figure 3:
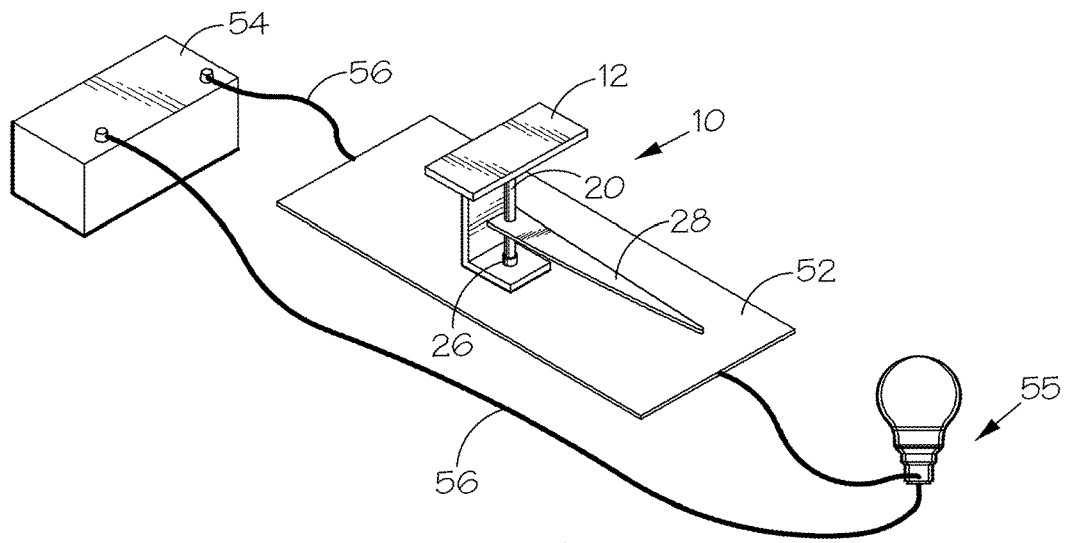
FIG. 3 shows the detection device of FIG. 1 mounted on a plate underneath which an electric current is passing.

In FIG. 3, the primary energy source is an electrified metal plate 52, supplied with electrical current from a battery 54 and conductors 56, and on which a primary sample material is locatable. Alternatively, the primary energy source 38 may be the incandescent light bulb 55 (or other light/heat emitter), connected directly to the battery 54 by the conductors 56 without the electrical plate 52, above or near which the primary sample material is locatable. In this embodiment, it would be preferable to locate the needle 28 above the incandescent light bulb 55 such that the primary sample material is near, and more preferable, lies between the incandescent light 55 and the needle 28.

Figure 4:
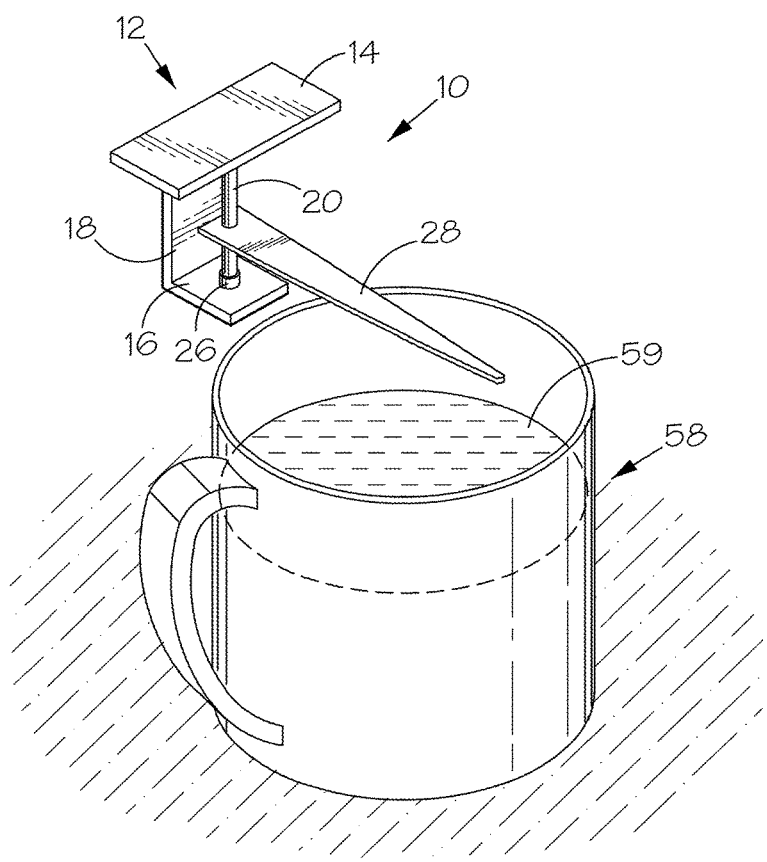
FIG. 4 shows the detection device of FIG. 1 mounted over a cup of hot water.

In FIG. 4, the primary energy source is heat from a receptacle 58 holding a volume of heated liquid 59, i.e. water, over which the needle 28 is located. It will be appreciated that the heated water in this embodiment may act as both the primary energy source and the primary sample material.

Figure 5:
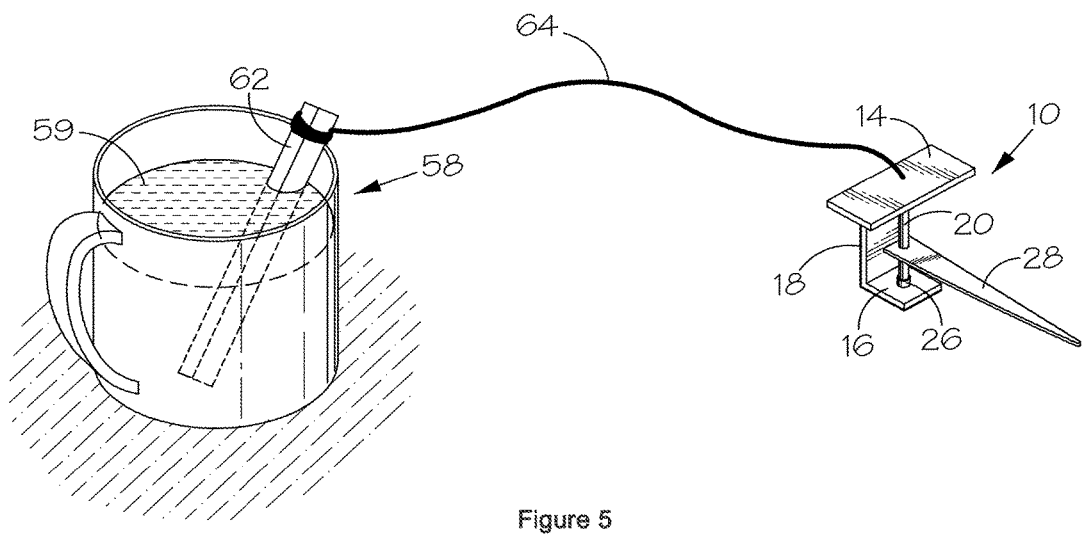
FIG. 5 shows the detection device of FIG. 1 connected to a metal staff in the cup of hot water of FIG. 4.

Alternatively, and as illustrated in FIG. 5, a collector member 62 may be submersed in the heated liquid 59 and connected to the detector 10 via a conductor member 64.

Figure 6:
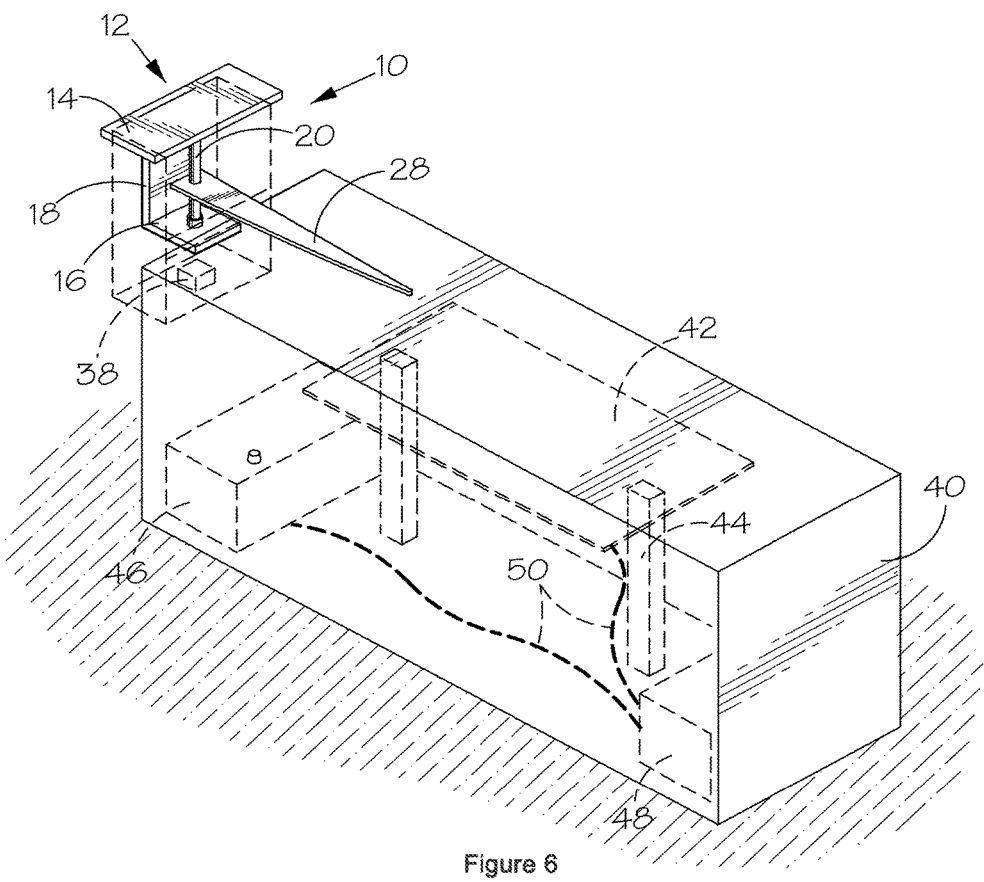
FIG. 6 shows the detection device of FIG. 2 mounted over a container in which is mounted a metal plate.

FIG. 6 shows an embodiment of the invention where more than one energy source is utilised. In this embodiment, the detector 10 operates with the primary energy source 38 (i.e. a magnet) and a secondary energy source 42, which secondary energy source 42 will is elaborated on later in the specification.

The secondary energy source 42 is much the same as the one illustrated in FIG. 3, having an electrified metal plate 42 (i.e. possibly copper) supported on legs 44 (possibly wooden) within a container 40. Conductors 50 connect the metal plate 42 to a battery 46 and a switch 48. It will be appreciated that as an alternative, the primary energy source may be the electrified plate 42 with the secondary energy source being reference 38, i.e. a magnet.

Figure 9:
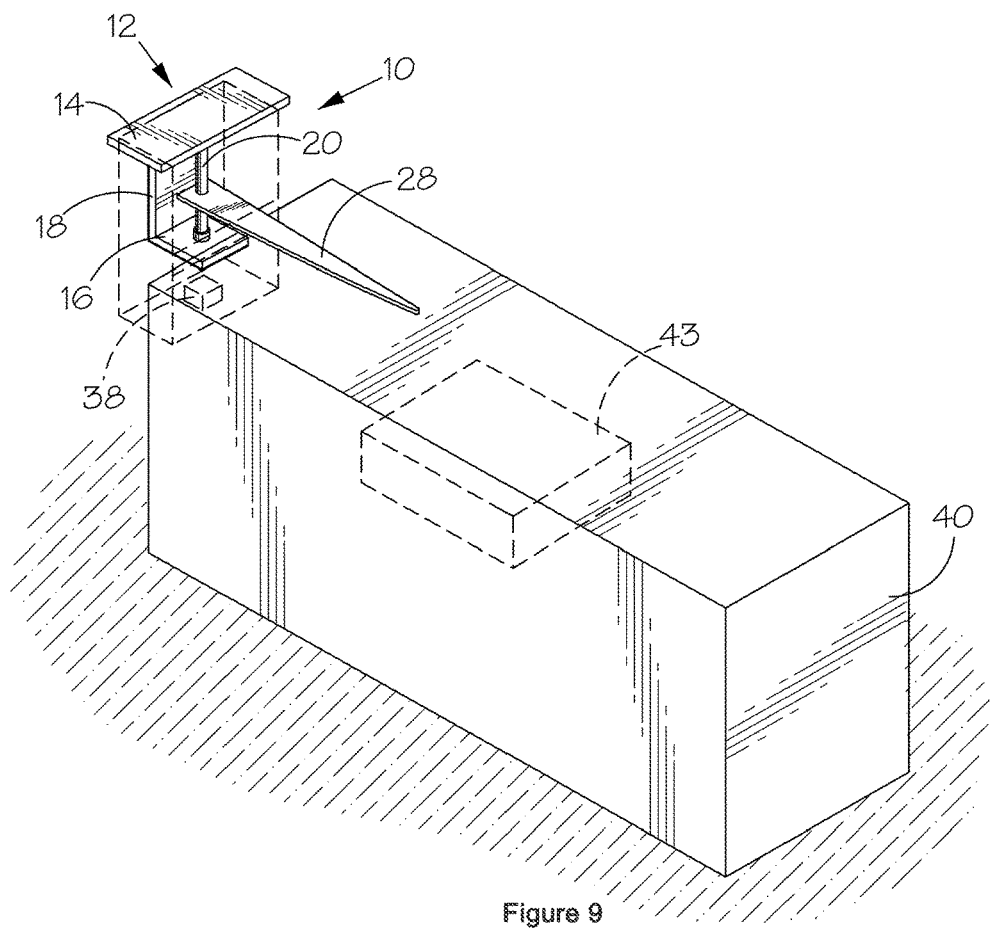
FIG. 9 shows the detection device of FIG. 2 mounted over a magnet.

In a slight variation to the embodiment illustrated in FIG. 6, both the primary and the secondary energy sources 38, 43 (or vice versa) may be electromagnets or permanent magnets as depicted in FIG. 9.

Figure 7:
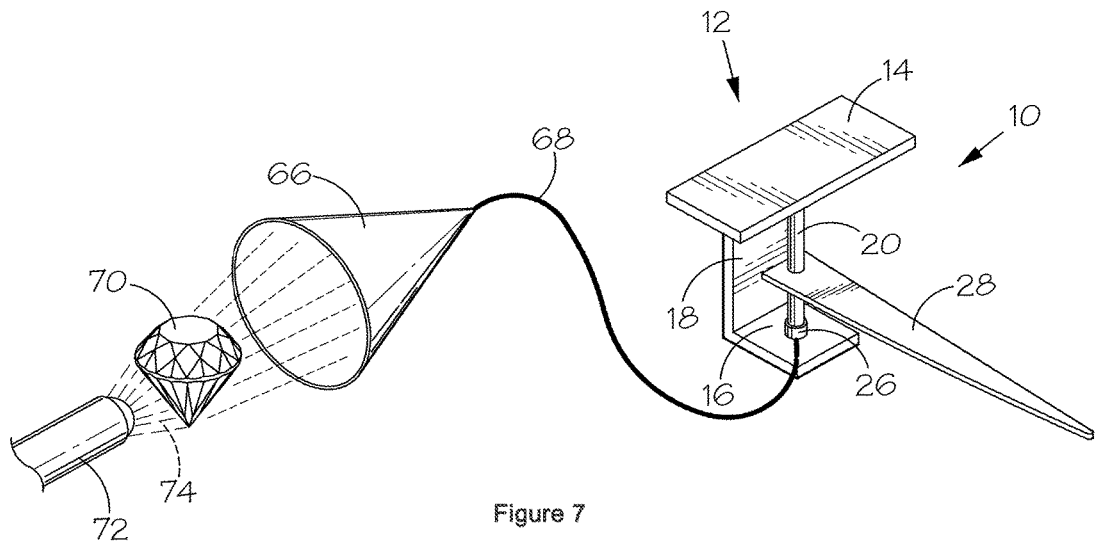
FIGS. 7 & 8 shows two further arrangements in accordance with the method of the invention including the detection device of FIG. 1.
Figure 8:
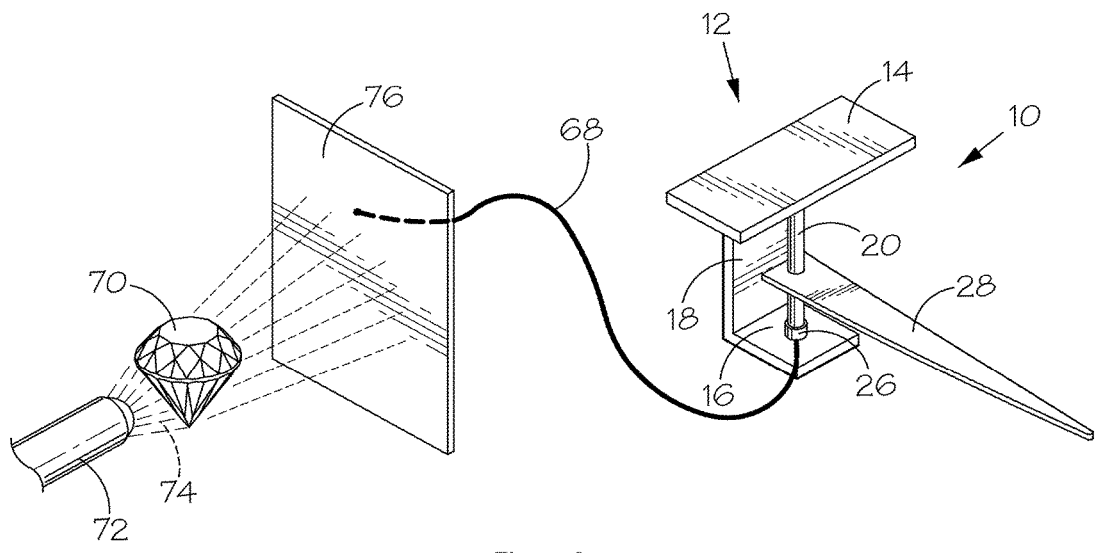

In FIGS. 7 and 8, the primary energy source is a laser light emitter 72 subjecting light energy 74 (photons) onto the target material 70 (i.e. a diamond) in a direction towards a collector member in the form of a metal cone 66 or metal plate 76. A connector member 68 connects the collector member 66, 76 to the detector 10.

Figure 10:
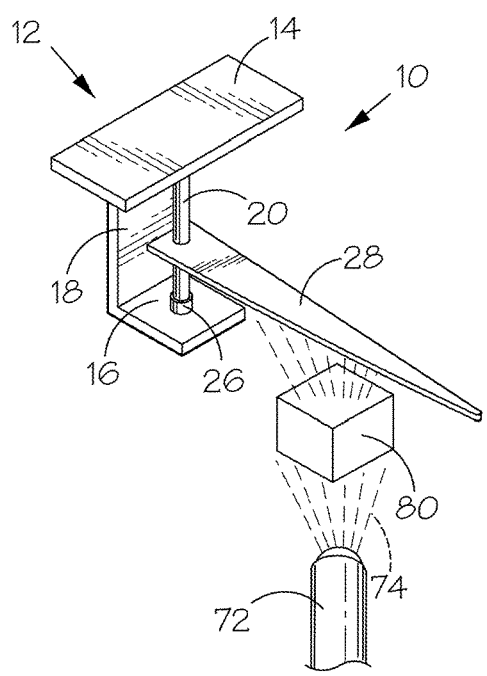
FIG. 10 shows the detection device of FIG. 2 and a sample of a material to be detected.

FIG. 10 illustrates another embodiment where no collector or conductor members are utilised. In this embodiment, the primary energy source is a laser light emitter 72 subjecting light energy 74 (photons) onto the target material 70 (i.e. a diamond or a magnet retaining some properties or signature or quantum characteristic of the diamond) in a direction towards the needle 28.

Figure 11:
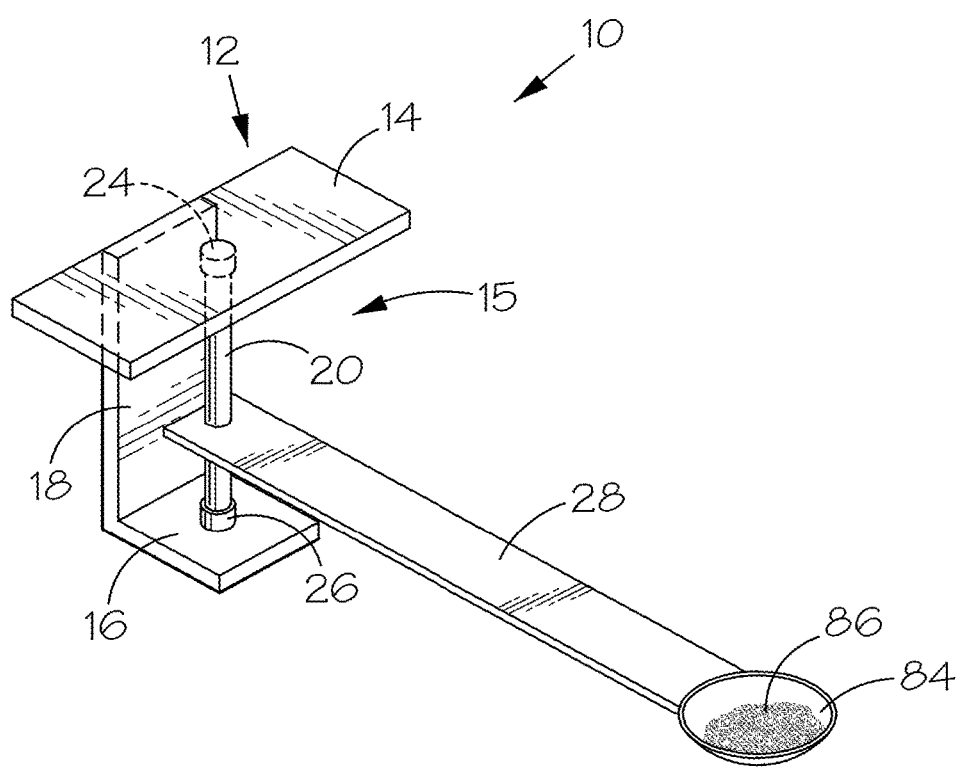
FIG. 11 shows another embodiment of the detection device of FIG. 1.

FIG. 11 illustrates an embodiment of the detector 10 including, on the needle 28 thereof, a purpose-built spoon-like formation 84 into which a sample material 86 (typically a secondary sample material, which will be elaborated on later in the description) is supported or mounted. It will be appreciated that instead of having a purpose-built spoon-like formation 84, the sample material 86 may simply be supported or mounted directly on the needle 28 of the type depicted in any of the FIGS. 1 to 10.

The detector 10 further includes a means for sensitising it, and/or more particularly, the indicating means 28 thereof (being the needle 28 in the illustrated embodiments), thereby to detect the force or energy acting on it by the excited target material, based on the maxim that similar matter communicates, more specially attracts and/or repels, other similar mater.

It will be appreciated that the sensitising means includes direct and/or indirect sensitising means.

Direct sensitising means is the physical supporting or mounting of the secondary sample material on the moving component of the indicating means, i.e. on the needle 28, whether positioned on the needle 28 as depicted in FIGS. 1 to 10 or in the purpose-built spoon-like formation 84 as depicted in FIG. 11.

Indirect sensitising means refers to the inclusion of a secondary energy source for subjecting the secondary sample material to energy within a detection zone, which detection zone:
 extends from the moving component of the indicating means (i.e. the needle 28) outwardly; or
 and as depicted in FIGS. 5, 7 and 8, is spaced from the indicating means and lies between the secondary energy source 59, 72 and the collector member, the collector member 62, 66, 76 being connected by a connector member 64, 68 to the detector 10.

It will be appreciated that the secondary sample material may be one and the same primary sample material, similar to the target material and/or related with the target material.

The secondary sample material, as is the case with the primary sample material, may even be an electromagnet or permanent magnet that at least temporarily retains within it, or within its electromagnetic or magnetic field, some of the properties or a signature or quantum characteristic of the target material, through a process that will be described later in the specification.

In some embodiments of the invention, the detector 10 comprises both primary and secondary energy sources, for example as depicted in FIGS. 6 and 9. Alternatively, a single energy source may act as both the primary and the secondary energy sources, as depicted in FIGS. 2, 3, 4, 5, 7, 8 and 10.

Although not necessary, it has been found that the accuracy and sensitivity of the detector 10 is increased when the energy sources are positioned near and/or beneath the moving component of the indicating means, i.e. beneath the needle 28.

The inventor has found that by following a particular methodology, the detector 10 is capable of detecting matter to which the needle 28 has been sensitized. The main steps of the methodology are:
exciting the target material (i.e. diamonds) by subjecting a primary sample material (for example a diamond) to energy emitted from the primary energy source, thereby to excite the primary sample material and theoretically other similar target material in the excitation zone;
sensitising the detector, or more specifically the moving component of the indicating means, thereby to detect a force or energy acting between the operatively sensitised device and/or the indicating means thereof and the excited target material; and
allowing the indicating means, or more specifically the moving component thereof, to freely move under the influence of the force or energy acting upon it by the target material so as to point in the direction of such target material in the excitation zone, thereby to detect the target material.

The inventor claims to have developed the detector 10 and the methodology set out herein through multiple simulations, which simulations are described below, and where possible, described with reference to the accompanying illustration.

Simulation 1

Simulation 1, with reference to FIG. 10, involved the following steps:
1. positioning a primary sample material 80 (i.e. a piece of sponge) beneath the needle 28;
2. positioning a primary energy source 72 (i.e. a torch) beneath the primary sample material 80 such that the primary sample material 80 is between the needle 28 and the primary energy source 72;
3. subjecting the primary sample material 80 to energy 74 (i.e. light and/or heat) emitted from the primary energy source 72 in the detection zone thereby to: (i) excite the primary sample material and consequently similar target material in the excitation zone; and (ii) sensitise the needle 28, through indirect sensitisation means, thereby to detect a force or energy acting between the operatively sensitised needle 28 and the excited target material;
4. moving another piece of sponge around (i.e. by hand movements or walking around the room in which the detector 10 is situated) thereby to simulate target material to be detected; and
5. observing how the needle 28 moves about and finally settles in a position pointed towards the simulated target material.

Observations and findings of simulation 1:
the sensitivity of the needle 28, through direct sensitisation means, could be increased by connecting a connector member between the detector 10 and the primary sample material (i.e. an electrical wire or optical fibre connected and/or wound about the body 12 at one end, and connected to the piece of sponge subjected to the light energy at the other end, i.e. with a crocodile clip);

the sensitivity of the needle 28, through direct sensitisation means, could also be increased by mounting on the needle 28, preferably close to a free end thereof, a secondary sample material (i.e. another piece of sponge)—where the sample is mounted to the needle 28 as depicted in FIGS. 1 to 10, or retained in a purpose-built formation 84 on the needle 28 as depicted in FIG. 11;

with increased sensitisation of the needle 28, the primary sample material 80 and the primary energy source 72 may be moved remotely from beneath the needle 28 (i.e. the detection zone could be increased);

the detection zone could also be increased by increasing the energy emitted from the primary energy source;

the secondary sample material can be another piece of sponge, or instead be replaced by an electromagnet or permanent magnet that at least temporarily retains within it, or within its electromagnetic or magnetic field, some of the properties or a signature or quantum characteristic of the sponge—this is attained by, in the presence of the electromagnet or permanent magnet and in a sample zone, subjecting the sponge to energy thereby creating a "clone" of the sponge;

the electromagnet or permanent magnet acting as the secondary sample material may be "cloned" prior to or post mounting to the needle 28;

where the secondary sample material is a "cloned" magnet (electro or permanent), the magnet acts as a secondary energy source with a field (i.e. magnetic field) acting within the field of the primary energy source (i.e. electromagnetic field created by the torch);

the piece of sponge used as the primary sample material can be replaced by an electromagnet or permanent magnet much the same way as described above (i.e. by "cloning" in the presence of the sponge), and in so doing acting as its own primary energy source thereby eliminating the need for the torch—which resembles very closely the embodiment of the invention depicted in FIG. 9; and where the primary sample material is a "cloned" magnet (electro or permanent) and its own primary energy source, the secondary sample material and secondary energy source may not be required—which resembles very closely the embodiment of the invention depicted in FIG. 2.

Simulation 2

Simulation 2, with reference to FIG. 3, involved the following steps:
1. positioning the detector 10, or at least the needle 28 thereof, above a metal plate 52, which will ultimately act as the primary energy source;
2. positioning a primary sample material (i.e. a piece of rubber tube) on the metal plate 52 such that the primary sample material lies between the needle 28 and the primary energy source 52;
3. electrifying the metal plate 52 thereby subjecting the primary sample material to energy (i.e. electrical and/or heat) in the detection zone thereby to: (i) excite the primary sample material and consequently similar target material in the excitation zone; and (ii) sensitise the needle 28, through indirect sensitisation means, thereby to detect a force or energy acting between the operatively sensitised needle 28 and the excited target material;
4. moving another piece of rubber tube around (i.e. by hand movements or walking around the room in which the detector 10 is situated) thereby to simulate target material to be detected; and
5. observing how the needle 28 moves about and finally settles in a position pointed towards the simulated target material.

Observations and findings of simulation 2:
the sensitivity of the needle 28, through direct sensitisation means, could be increased by connecting detector 10 to the electrified plate 52 and/or setting the detector down on the electrified plate 52; and many, if not all, of the findings of simulation 1 could be incorporated into simulation 2 to enhance and/or increase the accuracy and efficient of the detector 10.

Simulation 3

Simulation 3, with reference to FIG. 4, involved the following steps:
1. positioning the detector 10, or at least the needle 28 thereof, above a cup 58 containing a volume of hot water 59, which hot water 59 acts as the primary sample material and its own primary energy source such that the hot water 59 excited by its own heat in the detection zone: (i) excites similar target material (i.e. water) in the excitation zone; and (ii) sensitises the needle 28, through indirect sensitisation means, thereby to detect a force or energy acting between the operatively sensitised needle 28 and the excited target material;
2. moving another cup or water around (i.e. by hand movements or walking around the room in which the detector 10 is situated) thereby to simulate target material to be detected; and
3. observing how the needle 28 moves about and finally settles in a position pointed towards the simulated target material.

Observations and findings of simulation 3:
instead of positioning the detector 10 above the hot water 59, a collector member in the form of a metal staff 62 may be at least partially submerged in the hot water 59, with a connector member 64 connected between the staff 62 and the detector 10 so as to sensitise the needle 28 via direct means;

a certain amount of time is required to sensitise the needle 28—typically around 1 minute;

if the hot water in the cup cools off, the needle 28 tends to point to metals made from which the staff 62 is made rather than water (i.e. target material changed);

the sensitivity of the needle 28, through direct sensitisation means, could also be increased by placing a drop of water on the needle 28; and many, if not all, of the findings of simulations 1 and 2 could be incorporated into simulation 3 to enhance and/or increase the accuracy and efficient of the detector 10.

Simulation 4

Simulation 4, with reference to FIGS. 7 and 8, involved the following steps:
1. positioning a primary sample material 70 (i.e. a diamond) remote from the detector 10;
2. positioning a primary energy source 72 (i.e. a laser) on one side of the primary sample material 70 with a collector member 66, 76 positioned on an opposite side of the primary sample material 70 such that the primary sample material 70 is located between the collector member 66, 76 and the primary energy source 72;
3. connecting, by means of a connector member 68, the collector member 66, 76 and the detector 10;
4. subjecting the primary sample material 70 to energy 74 (i.e. photons) emitted from the primary energy source 72 in the detection zone located remotely from the detector 10 thereby to: (i) excite the primary sample material and consequently similar target material in the excitation zone; and (ii) sensitise the needle 28, through direct sensitisation means, thereby to detect a force or energy acting between the operatively sensitised needle 28 and the excited target material;
5. moving another diamond around (i.e. by hand movements or walking around the room in which the detector 10 is situated) thereby to simulate target material to be detected; and
6. observing how the needle 28 moves about and finally settles in a position pointed towards the simulated target material.

Observations and findings of simulation 4:
the primary sample material 70 may be spaced from the collector member 66, 76 or in contact therewith; and
many, if not all, of the findings of simulations 1 to 3 could be incorporated into simulation 4 to enhance and/or increase the accuracy and efficient of the detector 10.

Simulation 5

Simulation 5, involved the following steps:
1. positioning a primary secondary sample material (i.e. a strand of a subject's hair) on the exposed antenna of a primary energy source, in the form of a radio wave emitter;
2. positioning a secondary sample material (i.e. a saliva sample from the same subject) beneath the needle 28;
3. switching on the primary energy source so as to subject the primary sample material to radio wave energy (at any frequency) in the detection zone thereby to: (i) excite the primary sample material and consequently similar target material in the excitation zone; and (ii) sensitise the needle 28, through indirect sensitisation means thereof with the saliva sample, so as to detect a force or energy acting between the operatively sensitised needle 28 and the excited target material;
4. having the subject move around thereby to simulate target material to be detected; and
5. observing how the needle 28 moves about and finally settles in a position pointed towards the simulated target material.

Observations and findings of simulation 5:
the secondary sample material may alternatively be placed directly on the needle 28, or "cloned" to a magnet (electro or permanent) that is placed beneath the needle 28 or directly thereon; and
many, if not all, of the findings of simulations 1 to 4 could be incorporated into simulation 5 to enhance and/or increase the accuracy and efficient of the detector 10.

It will be appreciated that many variations and/or other simulations may be undertaken to show the principles under which the detector 10 and method of using such detector 10 operate.

Another example is an alternative process for the "cloning" of electromagnets or permanent magnets, whereby a fresh electromagnet or permanent magnet is brought into the electromagnetic or magnetic field of the already "cloned" magnet there by to "clone" the fresh magnet (electro or permanent).

The inventor concedes that he may not fully understand the scientific principles that enable the technology described herein to work, but is confident that matter communicates (energies, frequencies, vibrations) with other similar matter on a premise similar but not necessarily the same as how magnetic objects attract and/or repel one another.

It is believed that the closest similar matter under detection exerts the largest force, and that the magnitude of the force exerted is correlated to the mass, density or size of the material under detection.

Although the invention has been described above with reference to preferred embodiments, it will be appreciated that many modifications or variations of the invention are possible without departing from the spirit or scope of the invention.

For example, the inventor is confident that a digital version of the detector will ultimately be capable of detecting direction, distance and elevation, as well as the specific mass, density and size of the target material.

The invention claimed is:
1. A device for detecting a target material including:
a means for indicating the direction to the target material, the indicating means incorporating at least an information output component for outputting information relating to the target material, and at least one moving component on which the force or energy of the target material operatively acts, wherein:
the moving component of the indicating means is a free moving needle, a mass weighing apparatus, a gyroscope or any combination thereof; and
the information output component of the indicating means is:
(i) the moving component of the indicating means, the operative movement or direction in which the moving component respectively moves or points communicates at least the direction of the target material; or
(ii) a visual or audible readout of at least the direction of the target material correlated to the movement of the moving component of the indicating means;
a primary energy source for subjecting a primary sample material to energy for exciting the primary sample material, thereby identifying the target material to be detected, wherein:
the primary energy source is one or more energy emitters from a group of emitters including: electromagnetic energy emitters, magnetic energy emitters, sound energy emitters, thermal energy emitters, chemical energy emitters and electrical current emitters; and
the primary sample material being subjectable to the energy from the primary energy source within an excitation zone, which excitation zone extends from such primary energy source outwardly, and further wherein the primary sample material:
(i) is similar to the target material;
(ii) is related with the target material; or
(iii) at least temporarily retains within it, or an electromagnetic or magnetic field thereof, some of the properties of the target material; and
a means for sensitising the device or the indicating means thereof thereby to detect a force or energy acting between the operatively sensitised device and/or the indicating means thereof and the target material;

characterised in that the sensitising means includes direct or indirect sensitising means, wherein:
(i) direct sensitising means is the physical mounting of a secondary sample material on the moving component of the indicating means; and
(ii) indirect sensitising means is a secondary energy source for subjecting a secondary sample material to energy within a detection zone which:
a. extends from the moving component of the indicating means outwardly; or
b. is spaced from the indicating means and lies between the secondary energy source and a collector member, the collector member being connected by a connector member to the device or the moving component of the indicating means thereof;
and further wherein the secondary sample material is at least one of:
(i) the primary sample;
(ii) similar to the target material;
(iii) related with the target material; and
(iv) at least temporarily retains within it, or an electromagnetic or magnetic field thereof, some of the properties of the target material;
such that in use, and under the influence of such force or energy of the target material acting on the at least one of sensitised device and the indicating means thereof, the indicating means points in the direction of such detected target material.

2. A device according to claim 1, wherein the free moving needle is pivotally displaceable about one or more pivot axes.

3. A device according to claim 2, wherein the needle is pivotally supported near one of its ends.

4. A device according to claim 3, wherein the primary sample material and the primary energy source is one and the same.

5. A device according to claim 4, wherein the device comprises both the primary and secondary energy sources, or a single energy source acting as the primary and/or the secondary energy sources.

6. A device according to claim 5, wherein at least one of the energy sources is positioned near or beneath the moving component of the indicating means.

7. A device according to claim 6 further including a means for locating at least one of the primary and the secondary sample material in the detection zone.

8. A device according to claim 7, wherein the free moving needle of the indicating means is pivotally displaceable about or on an axle relative to a U-shaped support body, the axle extending across the U-shaped support body at a location near first and second free ends thereof.

9. A device according to claim 8, wherein the device is portable and comprises a means for levelling the device.

10. A method for detecting a target material including the steps of:
(A) subjecting a primary sample material to energy from a primary energy source in an excitation zone extending outwardly from such primary energy source so as to excite the primary sample material, thereby identifying the target material to be detected, wherein:
the primary energy source is one or more energy emitters from a group of emitters including: electromagnetic energy emitters, magnetic energy emitters, sound energy emitters, thermal energy emitters, chemical energy emitters and electrical current emitters; and wherein
the primary sample material:
(i) is similar to the target material;
(ii) is related with the target material; or
(iii) at least temporarily retains within it, or an electromagnetic or magnetic field thereof, some of the properties of the target material;
(B) sensitising a device or an indicating means thereof thereby to detect a force or energy acting between the operatively sensitised device or the indicating means thereof and the target material wherein the sensitisation of the device or the indicating means is attained directly or indirectly, and further wherein:
(i) direct sensitisation is attained by physically mounting a secondary sample material on a moving component of the indicating means; and
(ii) indirect sensitisation is attained by subjecting a secondary sample material to the energy of a secondary energy source within a detection zone which:
a. extends outwardly from the moving component of the indicating means; or
b. is spaced from the moving component of the indicating means and lies between the secondary energy source and a collector member, the collector member being connected by a connector member to the device or the moving component of the indicating means thereof;
the secondary sample material:
(i) being the primary sample;
(ii) being similar to the target material;
(iii) being related with the target material; or
(iv) at least temporarily retains within it, or an electromagnetic or magnetic field thereof, some of the properties of the target material; and
(C) allowing the indicating means, under the influence of such force or energy, to point in the direction of such detected target material.

11. A method according to claim 10, wherein the primary sample material and the primary energy source is one and the same.

12. A method according to claim 10, wherein the primary and the secondary energy sources are independent energy sources, or a single energy source acting as the primary or the secondary energy sources.

13. A method according to claim 12, wherein at least one of the energy sources is positioned near or beneath the moving component of the indicating means.

14. A method according to claim 13, wherein the moving component of the indicating means is a free moving needle, a mass weighing apparatus, a gyroscope or any combination thereof, and further wherein the indicating means includes at least an information output component being:
the moving component of the indicating means, the operative movement or direction in which the moving component respectively moves or points communicates at least the direction of the target material; or
a visual or audible readout of at least the direction of the target material correlated to the movement of the moving component of the indicating means.

15. A method according to claim 14 including the step of mounting the free moving needle such that it is pivotally displaceable about one or more pivot axes.

16. A method according to claim 15, wherein the free moving needle is pivotally displaceable about or on an axle relative to a U-shaped support body, the axle extending across the U-shaped body at a location near first and second free ends thereof.

17. A method according to claim 10 including, in a sample zone and in the presence of an electromagnet or permanent magnet, subjecting a sample of the target material to energy from the primary energy source such that the electromagnet or permanent magnet at least temporarily retains within it, or an electromagnetic or magnetic field thereof, some of the properties of the target material, such that the electromagnet or permanent magnet acts as the primary sample material.

18. A method according to claim 17 including the further step of removing the sample of the target material and locating the electromagnet or permanent magnet in the detection zone.

19. A method according to claim 10 including, in a sample zone and in the presence of an electromagnet or permanent magnet, subjecting a sample of the target material to energy from the primary or the secondary energy source such that the electromagnet or permanent magnet at least temporarily retains within it, or an electromagnetic or magnetic field thereof, some of the properties of the target material, such that the electromagnet or permanent magnet acts as the secondary sample material.

20. A method according to claim 19 including the further step of removing the sample of the target material and mounting the electromagnet or permanent magnet on the moving component of the indicating means before or after subjecting the sample of the target material to energy from the primary or the secondary energy source.

* * * * *